United States Patent [19]

Kotecki et al.

[11] Patent Number: 5,120,931
[45] Date of Patent: Jun. 9, 1992

[54] ELECTRODE AND FLUX FOR ARC WELDING STAINLESS STEEL

[75] Inventors: Damian J. Kotecki, Mentor; Jonathan S. Ogborn, Euclid, both of Ohio

[73] Assignee: The Lincoln Electric Company, Cleveland, Ohio

[21] Appl. No.: 684,308

[22] Filed: Apr. 12, 1991

[51] Int. Cl.[5] .......................... B23K 35/362
[52] U.S. Cl. ................................ 219/146.22
[58] Field of Search ............... 219/146.22, 146.23, 219/146.41

[56] References Cited

U.S. PATENT DOCUMENTS 4,345,140  8/1982  Godai et al. .............. 219/146.23

FOREIGN PATENT DOCUMENTS 55-149796  11/1980  Japan .............. 219/146.41
62-40995   2/1987   Japan .............. 219/146.22

Primary Examiner—Clifford C. Shaw
Attorney, Agent, or Firm—Body, Vickers & Daniels

[57] ABSTRACT

A flux for use in arc welding of a stainless steel workpiece with a consumable metal electrode having a precentage of chromium, which welding flux comprises a silica containing system for forming a slag on the surface of the deposited chromium-bearing alloy weld metal and a bismuth containing slag releasing agent selected from the class consisting of elemental bismuth, bismuth fluoride, bismuth sulfide, bismuth titanate, bismuth oxy carbonate, bismuth oxy-chloride and mixtures thereof. Also, there is provided an electrode employing this flux.

55 Claims, 2 Drawing Sheets

TABLE I    SLAG-FORMING COMPONENTS

| NO. | SiO$_2$ | TiO$_2$ | Na$_2$O | NaF | CaF$_2$ | Al$_2$O$_3$ | ZrO$_2$ | K$_2$O | KF | SnO$_2$ | BISMUTH | % | BEHAVIOR | REMOVAL |
|---|---|---|---|---|---|---|---|---|---|---|---|---|---|---|
| 1 | 2.15 | 6.43 | 0.65 |  | 0.20 | 0.14 | 1.23 | 0.03 |  |  | Bi metal | 0.05 | Popping | Moderate |
| 2 | 2.15 | 6.38 | 0.65 |  | 0.20 | 0.14 | 1.22 | 0.03 |  |  | Bi oxy-chloride | 0.15 | Quiet | Easy |
| 3 | 2.92 | 4.19 | 0.26 |  | 0.20 | 0.16 | 0.95 | 0.04 |  |  |  |  | Explosive | Very Difficult |
| 4 | 2.94 | 5.10 | 0.26 |  | 0.07 |  | 0.05 |  | 0.07 |  | Bi oxy-carbonate | 0.15 | Quiet | Easy |
| 5 | 2.94 | 5.00 | 0.26 |  | 0.07 |  | 0.05 |  | 0.07 | 0.25 |  |  | Explosive | Very Difficult |
| 6 | 2.93 | 4.53 | 0.26 |  | 0.07 |  | 0.05 |  | 0.07 | 0.74 |  |  | Popping | Difficult |
| 7 | 2.94 | 5.00 | 0.26 |  | 0.07 |  | 0.05 |  | 0.07 |  | Bi fluoride | 0.25 | Quiet | Easy |
| 8 | 2.94 | 5.12 | 0.26 |  | 0.07 |  | 0.05 |  | 0.07 |  | Bi fluoride | 0.12 | Quiet | Easy |
| 9 | 2.94 | 4.88 | 0.26 |  | 0.07 |  | 0.05 |  | 0.07 | 0.25 | Bi fluoride | 0.12 | Quiet | Easy |
| 10 | 2.94 | 5.17 | 0.26 |  | 0.07 |  | 0.05 |  | 0.07 |  | Bi fluoride | 0.07 | Popping | Moderate |
| 11 | 2.94 | 4.88 | 0.26 |  | 0.07 |  | 0.05 |  | 0.07 | 0.25 | Bi oxy-chloride | 0.12 | Quiet | Easy |
| 12 | 2.94 | 4.88 | 0.26 |  | 0.07 |  | 0.05 |  | 0.07 | 0.25 | Bi sulfide | 0.12 | Quiet | Easy |
| 13 | 2.94 | 4.91 | 0.26 |  | 0.07 |  | 0.05 |  | 0.07 | 0.25 | Bi titanate | 0.10 | Quiet | Easy |
| 14 | 3.45 | 4.54 | 0.66 | 0.10 | 0.00 |  | 0.00 |  | 0.00 |  | Bi fluoride | 0.10 | Quiet | Easy |
| 15 | 3.45 | 4.54 | 0.66 | 0.10 | 0.00 |  | 0.00 |  | 0.00 |  | Bi metal | 0.25 | Quiet | Easy |
| 16 | 3.44 | 4.89 | 0.16 | 0.10 | 0.00 |  | 0.05 |  | 0.00 |  | Bi fluoride | 0.10 | Quiet | Easy |
| 17 | 2.61 | 3.49 | 0.58 | 0.07 | 0.00 |  | 0.04 |  | 0.00 |  | Bi fluoride | 0.10 | Quiet | Easy |

FIG. I

TABLE I — SLAG-FORMING COMPONENTS

| NO. | SiO2 | TiO2 | Na2O | NaF | CaF2 | Al2O3 | ZrO2 | K2O | KF | SnO2 | BISMUTH | % | BEHAVIOR | REMOVAL |
|---|---|---|---|---|---|---|---|---|---|---|---|---|---|---|
| 1 | 2.15 | 6.43 | 0.65 | | | | | | | | Bi metal | 0.05 | Popping | Moderate |
| 2 | 2.15 | 6.38 | 0.65 | | 0.20 | 0.14 | 1.23 | 0.03 | | | Bi oxy-chloride | 0.15 | Quiet | Easy |
| 3 | 2.92 | 4.19 | 0.26 | | 0.20 | 0.14 | 1.22 | 0.03 | | | | | Explosive | Very Difficult |
| 4 | 2.94 | 5.10 | 0.26 | | 0.07 | 0.16 | 0.95 | 0.04 | 0.07 | | Bi oxy-carbonate | 0.15 | Quiet | Easy |
| 5 | 2.94 | 5.00 | 0.26 | | 0.07 | | 0.05 | | 0.07 | 0.25 | | | Explosive | Very Difficult |
| 6 | 2.93 | 4.53 | 0.26 | | 0.07 | | 0.05 | | 0.07 | 0.74 | | | Popping | Difficult |
| 7 | 2.94 | 5.00 | 0.26 | | 0.07 | | 0.05 | | 0.07 | | Bi fluoride | 0.25 | Quiet | Easy |
| 8 | 2.94 | 5.12 | 0.26 | | 0.07 | | 0.05 | | 0.07 | | Bi fluoride | 0.12 | Quiet | Easy |
| 9 | 2.94 | 4.88 | 0.26 | | 0.07 | | 0.05 | | 0.07 | 0.25 | Bi fluoride | 0.12 | Quiet | Easy |
| 10 | 2.94 | 5.17 | 0.26 | | 0.07 | | 0.05 | | 0.07 | | Bi fluoride | 0.07 | Popping | Moderate |
| 11 | 2.94 | 4.88 | 0.26 | | 0.07 | | 0.05 | | 0.07 | 0.25 | Bi oxy-chloride | 0.12 | Quiet | Easy |
| 12 | 2.94 | 4.88 | 0.26 | | 0.07 | | 0.05 | | 0.07 | 0.25 | Bi sulfide | 0.12 | Quiet | Easy |
| 13 | 2.94 | 4.91 | 0.26 | | 0.07 | | 0.05 | | 0.07 | 0.25 | Bi titanate | 0.10 | Quiet | Easy |
| 14 | 3.45 | 4.54 | 0.66 | 0.10 | 0.00 | | 0.00 | | 0.00 | | Bi fluoride | 0.10 | Quiet | Easy |
| 15 | 3.45 | 4.54 | 0.66 | 0.10 | 0.00 | | 0.00 | | 0.00 | | Bi metal | 0.25 | Quiet | Easy |
| 16 | 3.44 | 4.89 | 0.16 | 0.10 | 0.00 | | 0.05 | | 0.00 | | Bi fluoride | 0.10 | Quiet | Easy |
| 17 | 2.61 | 3.49 | 0.58 | 0.07 | 0.00 | | 0.04 | | 0.00 | | Bi fluoride | 0.10 | Quiet | Easy |

FIG. 2

TABLE II — SLAG-FORMING COMPONENTS

| NO. | SiO₂ | TiO₂ | Na₂O | CaF₂ | Al₂O₃ | ZrO₂ | K₂O | KF | SnO₂ | OTHER | % | BEHAVIOR | REMOVAL |
|---|---|---|---|---|---|---|---|---|---|---|---|---|---|
| 18 | 2.15 | 6.29 | 0.65 | 0.20 | 0.14 | 1.22 | 0.03 | | | Niobium Oxide | 0.25 | Explosive | Very Difficult |
| 19 | 2.15 | 6.29 | 0.65 | 0.20 | 0.14 | 1.22 | 0.03 | | | Vanadium Oxide | 0.25 | Explosive | Very Difficult |
| 20 | 2.92 | 3.96 | 0.26 | 0.20 | 0.16 | 0.95 | 0.04 | | | Lanthanum Oxide | 0.25 | Explosive | Very Difficult |
| 21 | 2.92 | 3.96 | 0.26 | 0.20 | 0.16 | 0.95 | 0.04 | | | Tantalum Oxide | 0.25 | Explosive | Very Difficult |
| 22 | 2.92 | 3.96 | 0.26 | 0.20 | 0.16 | 0.95 | 0.04 | | | Chromium Oxide | 0.26 | Explosive | Very Difficult |
| 23 | 2.92 | 3.96 | 0.26 | 0.20 | 0.16 | 0.94 | 0.04 | | | Iron Oxide | 0.29 | Explosive | Very Difficult |
| 24 | 2.92 | 3.96 | 0.26 | 0.20 | 0.16 | 0.95 | 0.04 | | | Copper Oxide | 0.25 | Explosive | Very Difficult |
| 25 | 2.92 | 3.96 | 0.26 | 0.20 | 0.16 | 0.95 | 0.04 | | | Nickel Oxide | 0.25 | Explosive | Very Difficult |
| 26 | 2.94 | 5.00 | 0.26 | 0.07 | | 0.05 | | 0.07 | | Titanium Sulfide | 0.25 | Explosive | Very Difficult |
| 27 | 2.94 | 5.00 | 0.26 | 0.07 | | 0.05 | | 0.07 | | Tungsten Oxide | 0.25 | Explosive | Very Difficult |
| 28 | 2.94 | 5.00 | 0.26 | 0.07 | | 0.05 | | 0.07 | | Thorium Oxide | 0.25 | Explosive | Very Difficult |
| 29 | 2.94 | 5.00 | 0.26 | 0.07 | | 0.05 | | 0.07 | | Zinc Oxide | 0.25 | Explosive | Very Difficult |
| 30 | 2.94 | 5.00 | 0.26 | 0.07 | | 0.05 | | 0.07 | | Lead Oxide | 0.25 | Explosive | Very Difficult |
| 31 | 2.94 | 4.76 | 0.26 | 0.07 | | 0.05 | | 0.07 | | Antimony Trioxide | 0.49 | Popping | Difficult |
| 32 | 2.94 | 4.76 | 0.26 | 0.07 | | 0.05 | | 0.07 | | Antimony Pentoxide | 0.49 | Popping | Difficult |
| 33 | 2.94 | 5.11 | 0.25 | 0.07 | | 0.05 | | 0.07 | | Tin Metal | 0.25 | Explosive | Very Difficult |
| 34 | 2.94 | 5.00 | 0.26 | 0.07 | | 0.05 | | 0.07 | | Germanium Oxide | 0.25 | Explosive | Very Difficult |
| 35 | 2.94 | 5.00 | 0.26 | 0.07 | | 0.05 | | 0.07 | | Gallium Oxide | 0.25 | Explosive | Very Difficult |
| 36 | 2.93 | 4.53 | 0.26 | 0.07 | | 0.05 | | 0.07 | | Lead Oxide | 0.73 | Popping | Difficult |
| 37 | 2.94 | 4.76 | 0.26 | 0.07 | | 0.05 | | 0.07 | 0.25 | Calcium Sulfite | 0.25 | Explosive | Very Difficult |

ELECTRODE AND FLUX FOR ARC WELDING STAINLESS STEEL

The present invention relates to the art of arc welding stainless steel and more particularly to an electrode and flux for gas shielded flux cored arc welding of stainless steel.

INCORPORATION BY REFERENCE

Incorporated by reference herein is Godai U.S. Pat. No. 4,345,140 relating to a composite wire or electrode containing a flux including a silica and a specific metal oxide with a low melting point of no more than 888° C. This prior patent is directed to the concept of employing a metal oxide in a flux or electrode of the type to which the present invention is directed. One of the metal oxides is bismuth oxide; therefore, there is an incidental disclosure of bismuth oxide as a constituent of an arc welding flux in an electrode to be used in stainless steel welding. This reference does not teach or suggest the invention of the present application which is directed toward a releasing agent for slag in a high chromium-bearing alloy welding application, which releasing agent employs various compounds of bismuth to produce a bismuth releasing agent for the resulting slag. The discovery of this property of bismuth in the flux is not taught in Godai U.S. Pat. No. 4,345,140.

BACKGROUND OF INVENTION

The invention is particularly applicable to arc welding of stainless steel by a flux cored electrode having at least about 15% chromium and it will be described with particular reference thereto; however, the invention has broader applications and may be used for coated electrodes and submerged arc welding of various high chromium steels and other chromium-bearing alloys.

When welding a high chromium-bearing alloy such as stainless steel, it is somewhat common practice to employ welding with a flux cored electrode that is used with a shielding gas such as $CO_2$ for the electric arc welding process. The electrode includes an outer steel sheath surrounding an inner core including a flux system in granular form and, in some instances, including alloying agents and additional iron powder. The cored electrode includes chromium in an appropriate amount, generally as powder within the core of the electrode. The chromium can be an alloying agent of the steel sheath. The core material is generally divided into the fluxing system or flux and the alloying constituents. In a high chromium electrode of the type used for flux cored arc welding of stainless steel, the fluxing system or flux often includes titanium dioxide, silica which may be in the form of a silicate, calcium fluoride and various other non-metallic compounds which react in the arc of the arc welding process to create a slag that forms over the outer surface of the weld bead to protect the weld bead until it has solidified and appropriately joined to the workpiece. This slag cover helps in forming the shape of the weld metal in the weld bead created by the flux cored arc welding process as well as protecting the molten alloy material in the weld bead until it has appropriately solidified. Stainless steel and other chromium-bearing alloys produce substantial problems in slag formation, since the chromium of the steel normally produces a chromium oxide which tends to adhere the non-metallic slag onto the outer surfaces of the weld bead. Thus, the slag adheres rigidly and tenaciously to the molten alloy of the weld bead as it is solidified. Due to the differential in thermal expansion coefficients, often the slag will be placed in compression and actually explode from the weld bead during cooling of the chromium-bearing alloy forming the weld bead. If the slag explodes from the weld bead during the solidification process, it exposes the surface of the weld bead for premature oxidation. In addition, special precautions must be taken to protect against the detrimental effect of exploding hot slag created during the welding process. Another difficulty experienced when using chromium-bearing alloy for the welding process is believed also associated with the formation of chromium oxide that has the tendency to adhere the slag onto the solidifying weld bead. If the slag remains on the weld bead, it is extremely difficult to remove, thus resulting in substantial cost and time for grinding the slag from the weld bead or otherwise removing the slag from the solidified molten chromium-bearing alloy forming the weld metal of the weld bead. All of these difficulties in welding chromium-bearing alloy are well known in the arc welding art. Thus, there is and always has been a need for a particular slag system that does not result in premature and/or violent removal of the slag during the cooling process, while also allowing convenient and inexpensive slag removal after the weld bead containing the chromium-bearing alloy has solidified and cooled. Thus, there is a substantial desire for a welding system to be used in a high chromium welding electrode or with a high chromium welding wire which will produce a slag that adheres to the molten metal alloy of the weld bead as it is being solidified for surface protection, but which can be easily removed from the weld bead after the cooling.

THE INVENTION

The present invention relates to a flux to be used with a high chromium weld bead, such as a weld bead having over 1.0% chromium and preferably for a stainless steel having greater than 15% chromium, wherein the slag will protect the chromium-bearing alloy as it is being solidified subsequent to the welding process, but which can be removed easily after cooling of the chromium-bearing alloy in the weld metal of the deposited weld bead.

This invention is more particularly applicable for flux cored high chromium electrodes and it will be described with particular reference thereto; however, it can be employed in arc welding electrodes wherein the flux is coated to the outside surface of the electrode or wherein a metal wire is used in a submerged arc welding process. In all instances, the flux system is applicable to create a slag over the weld bead which slag protects the weld bead until it is solidified and cooled while allowing convenient and inexpensive removal after the welding process has been completed.

If the electrode is a flux cored wire that does not contain a significant amount of chromium, i.e. substantially less than 1% chromium, slag behavior and slag removal are not serious problems; however, when chromium is added to the electrode for the purpose of depositing a chromium-bearing alloy, such as stainless steel onto the workpiece, slag behavior and removal tend to deteriorate for reasons mentioned previously. When the chromium percentage in the deposited alloy exceeds 15-20%, as in stainless steel, the non-metallic constituents of the flux system in the core should be selected to quiet the slag behavior and allow easy removal of the slag. This has been attempted by reducing the silica content, in the form of silicates or otherwise, of the non-metallic flux constituents when using carbon dioxide shielding; however, this procedure produces excessive spatter. By increasing the silica, which also means silicates, in place of the titanium dioxide in a fluxing system, the spatter of the welding process is reduced; however, the slag behavior and slag removal characteristics drastically deteriorate. Thus, it is desirable in a high chromium-bearing alloy welding process to use at least about 1.0% silica by weight of electrode to reduce spatter. To accomplish this, it has been found, in accordance with the invention, that a bismuth releasing compound renders the slag behavior quiet and removal quite easy and convenient. To further reduce the spatter, the silica composition can be increased above 2% by weight of the electrode so long as the bismuth is used.

In accordance with the invention, it has been found that any of a substantial number of compounds which will release elemental bismuth in the arc welding process will substantially quiet the slag during solidification and allow easy removal after solidification. Thus, the presence of bismuth has been found to substantially improve the slag characteristics in an arc welding process for high chromium-bearing alloys, such as stainless steel. This improvement is especially beneficial when the silica in the slag has over 1.0% by weight of the electrode or over about 10% by weight of the flux. This is substantially different than the teaching of Godai U.S. Pat. No. 4,345,140 indicating that the slag removal characteristic for stainless steel welding can be improved by any low melting point metal oxide. The present invention does not relate to that concept. Indeed, it has been found that metal oxides within the definition of the Godai patent, i.e. having melting points less than 888° C., do not produce remotely satisfactory slag removal characteristics for chromium-bearing alloy, such as stainless steel. For instance, vanadium pentoxide which comes within the low melting point definition of Godai U.S. Pat. No. 4,345,140, when used in the fluxing system of a stainless steel arc welding process, drastically diminishes the slag characteristics. This is shown in FIG. 2.

As low spatter is obtained by increasing the silica above 15.0% of the flux, or about 1.0% of the electrode, the tendency of the slag to explode and be very difficult to remove increases. Any of several bismuth releasing compounds cures this tendency and forms a part of this invention. The use of lead oxide and antimony oxide as taught by Godai U.S. Pat. No. 4,345,140 does not have this beneficial effect. Use of these low melting point metal oxides claimed in Godai does not produce slag which would be commercially acceptable. Massive doses of tin oxide also proved to be unsatisfactory in the slag removal process. Thus, low melting point metal oxides were not advantageous additives to the fluxing system for an arc welding process used in high chromium-bearing alloy welding.

The present invention relates to several bismuth compounds, each of which produces major improvements in the slag behavior and removal. Bismuth metal as well as bismuth oxy-chloride, bismuth titanate, bismuth fluoride, bismuth sulfide and other bismuth compounds used as a constituent of the fluxing system in an arc welding electrode environment produced slag characteristics as good as use of bismuth oxide suggested as one of several low melting point metal oxides in Godai U.S. Pat. No. 4,345,140. Thus, the present invention relates to the concept of a compound which will release bismuth during the welding process to improve the slag characteristic in an arc welding process for an alloy with high chromium.

Although the invention is primarily applicable for flux cored stainless steel electrodes, the inventive compounds, including also elemental bismuth, can be used in stainless steel electrodes and also in submerged arc welding processes. They can be used in welding consumables for other chromium-bearing alloys, such as hardfacing alloys. By the use of a bismuth producing slag releasing constituent in the fluxing system for an arc welding process and using silicates, marked improvement is obtained in slag behavior, even with increased silica used to lower spatter. By using a flux with a slag forming system incorporating a bismuth releasing compound, as set forth above, hot pieces of slag do not explode from the weld deposit surface as the weld bead is being cooled; therefore, the present invention reduces the hazard of burning associated with stainless steel flux coed arc welding. The present invention produces a slag which is quiet and easily removable.

The invention is the discovery that compounds which release bismuth in the arc during the arc welding process will obtain the result of a quiet slag which can be easily removed after cooling of the weld bead and its covering slag. The theory is not known to explain the fact that bismuth compounds used as an additive to the slag forming system of the flux produce a quiet and easy removal slag. Experiments with fluxing agents having very small amounts of silica (silicates) in a stainless steel flux cored electrode, i.e. where the silica is less than 0.5% of the weight of the electrode produced high spatter. Without the bismuth releasing additive of the present invention, these experiments showed that the slag separated from the solidifying alloy of the weld metal bead while the metal was still extremely hot. Consequently, the surface of the deposited metal weld bead oxidized substantially. This oxidation is a disadvantage in welding stainless steel with a low silica fluxing system. The slag exploded from the solidifying weld metal in the system using high silica (over about 1.0% of electrode weight or over 10% by weight of the flux) to obtain low spatter. If the silica was increased above about 10%–15% of the weight of the flux, whether the present invention was employed or not, the slag, when hot, was tightly adhered to the metal during the solidification. Thus, when the slag was ultimately removed, the metal of the weld bead had been protected so that there was little surface oxidation to the weld bead. Also, the slag could not be easily removed unless the present invention was used. It is only at relatively low temperatures during the cooling process for the high chromium-bearing alloy forming the weld bead that the effect of the present invention becomes apparent. By using silica up to 80% of the flux, spatter was decreased and the slag was quiet and easy to remove when using the invention. Without bismuth in the higher silica fluxes, the slag/metal interface resists separation. Thus, the slag fractures internally due to the shrinkage stress during cooling. Consequently, a large portion of the slag volume explodes off of the weld bead while the underlying layer remains tightly adhered to the metal, if bismuth is not present in the flux. On the other hand, with bismuth and a considerable amount of silica in the flux itself, the slag/metal interface shears or cleaves cleanly without violence. The slag pieces do not become projectiles.

Bismuth markedly alters the slag/metal interfacial energy so that free surfaces are easily formed during cooling. This allows shearing of the slag/metal interface during cooling to prevent explosion of the slag from the weld bead. In addition, after cooling, the slag can be conveniently and easily removed.

In accordance with the invention, elemental bismuth as well as the compounds set forth above can be employed for creating the advantageous slag characteristics for the stainless steel welding. The elemental bismuth can be a part of the fill in the core or an alloy of the welding wire or sheath of the electrode. Although the stainless steel is envisioned for use of the present invention, since chromium oxide is the apparent culprit in the deleterious effect on slag separation, the present invention can be employed in various chromium-bearing alloy welding environments. For that reason, the present invention can be employed for chromium-bearing alloy families such as 1.25% chromium-0.5% molybdenum and iron-chromium stainless steels as well as iron-chromium-nickel stainless steels with equal advantageous effects. Further, it is believed that the present invention could be used in iron-based hard facing alloys containing chromium and nickel based alloys also containing chromium. In all of these types of metals, high chromium, above about 1.0% by weight can cause the deleterious effect of the slag separation previously described. By employing the present invention, the slag is quiet and easily removed.

As indicated, it is believed that the slag deficiencies for welding chromium-bearing alloy is due to chromium oxide which locks the slag tightly onto the surface of the weld bead. It is believed that the use of bismuth in the non-metallic portion of the flux or in the metal of an electrode forms an interface between the slag and the metal. The bismuth is the critical constituent of the fluxing agent.

In accordance with the present invention, the flux is defined, as is normal practice, by the constituents forming the non-metallic slag creating system. The thermodynamic alteration of these constituents in the arc temperature which may exceed 5,000° C. does not define the flux itself but is the vehicle by which the flux is converted to a slag that accumulates on the outer surface of the molten metal forming the weld bead preparatory to solidification and cooling. It is believed that the present invention releases elemental bismuth to either affect the crystallization at the metal/slag interface or create a distinct layer or barrier at this interface. This postulate is supported by the fact that several bismuth containing compounds and elemental bismuth itself all work equally well in practicing the invention. In addition, when bismuth metal itself was included in the core, the slag characteristics were improved as additional metal was added above about 0.05% of the electrode which was about 0.80% by weight of the flux. Since bismuth is more stable at high temperature than the useful compounds of bismuth, bismuth metal itself is the resulting bismuth constituent in the resulting slag. Thus, the bismuth of the bismuth compounds and the elemental bismuth itself used in accordance with the present invention creates the improved slag behavior and slag removal characteristics obtainable by the present invention. It has been established that such behavior and removal characteristics are not obtainable merely by incorporating any of many low melting point metal oxides as suggested, incorrectly, in Godai U.S. Pat. No. 4,345,140. Indeed, the non-bismuth oxides of the Godai patent are not operative in enhancing the slag characteristics as obtained by the present invention.

The primary object of the present invention is the provision of an electrode containing a flux and/or a flux itself for arc welding of chromium-bearing alloy weld beads, such as stainless weld beads, which electrode and/or flux produces a slag over the solidified weld bead that has a quiet slag behavior and is easy to remove. Slag behavior is quiet when it remains on the weld bead during solidification and cooling without explosions, popping and other slag spattering mechanical phenomena.

Another object of the present invention is the provision of an electrode and flux, as defined above, which electrode and flux employ certain bismuth containing compounds or elemental bismuth itself so that bismuth is available at the slag/metal interface to cause a quiet slag behavior during cooling and easy slag removal. Indeed, the object is to produce a slag which will easily release itself from the weld bead with minor or no projection of the slag away from the weld bead especially when silicates are used in the flux.

BRIEF DESCRIPTION OF DRAWINGS

The invention is explained by use of the following drawing :

FIG. 1 is a Table I exhibiting experiments using the present invention; and,

FIG. 2 is a Table II showing test runs of selected oxides using the concept of the prior art.

Several examples of the present invention are set forth in Table I illustrated in FIG. 1. In evaluating slag behavior in arc welding installations as is done in Table I, the term "quiet" indicates that the slag may have some crackling noises during cooling and small pieces may even depart from the weld bead by a few inches; however, there is no major projection of the slag from the weld bead during cooling. Thus, the risk of facial injury by the welder is non existent. The term "popping" indicates that during cooling of the weld bead, hot pieces of slag depart from the weld bead surface with a distinct popping noise and with enough velocity to reach the facial height and inflict burns on a welder who has raised his hood and is otherwise unprotected. As indicated in Table I, using the present invention does not create slag behavior which is termed "popping", except for lower levels of elemental bismuth. (See Example No. 1 of Table I) The more radical classification of slag behavior is "explosive". In this classification, during cooling, hot pieces of slag depart from the weld bead surface with a distinct popping noise and with enough velocity to be hazardous not only to the welder himself but also to anyone within 20-25 feet of the welder. As shown in Table I, the slag behavior created by the present invention is "quiet". Turning now to the question of removal characteristics of the slag, the first classification is "easy". Easy slag removal indicates that the slag can be completely removed from the weld bead with only slight tapping and/or brushing. The next term for removal characteristics is "moderate" which indicates that the slag can be completely removed from the weld bead only after relatively hard hitting with a heavy hammer or other instrument. The next classification for removal of the slag is "difficult". A difficult slag removal situation indicates that slag can be completely removed from the weld bead only after numerous hard blows with a heavy hammer, such as a slag hammer. Pieces of the slag tend to cling to the weld bead even after this action and must be individually impacted by the hammer for removal. The last classification is "very difficult". When slag removal is very difficult, the slag does not remove completely from the weld bead even after numerous slag hammer blows and other physical intervention. In this situation, a needle gun may be necessary to clean the surface of the weld bead. Such difficulty of slag removal is not unusual when welding a chromium-bearing alloy, such as stainless steel. Chromium-bearing alloy welding can involve situations where the amount of chromium is 1% by weight of the weld metal deposited. In stainless steel, this chromium content is generally above 15% by weight of the metal deposited. Since the metal deposited is substantially the same as the metal of the electrode, these percentages are generally the same for the electrode itself. Thus, a stainless steel electrode will have chromium in the alloying portion of the electrode in excess of 15% by weight. Indeed, 15% by weight of the total electrode would generally be realized in stainless steel welding. Of course, many stainless steels also include nickel which enhances the ductility and corrosion resistance of the weld zone. Nickel is not an essential part of alloys of the present invention since the present invention relates to the concept of a flux or an electrode with a flux that can be used in a variety of chromium-bearing alloy arc welding processes. However, nickel may be a portion of the chromium-bearing alloy, or may be the principal alloy element.

As can be seen in Table I, when high silica, which may be in the form of silicates, is employed to protect the weld bead, the slag behavior and removal characteristics are not acceptable. (See Examples Nos. 3, 5 and 6 of Table I) When bismuth compounds are employed, the slag behavior is quiet and removal is easy. Table I is for E308LT-1 stainless steel electrodes, which is the AWS A5.22 classification. This electrode provides about 19% chromium by weight of the metal deposit. Other tests using 309L and 316L having 25% chromium and/or 18% chromium, respectively, produce the same results using the non metallic portions of the electrode taught by Table I which reports experiments with a cored electrode. These test electrodes had an outer steel metal sheath wherein the non-metallic slag forming constituents are contained in the core of the electrode. Alloying metals are also included in the core to produce the desired stainless steel weld bead during arc welding using the consumable electrode.

In the examples set forth in Table I, silica is employed. Silica could be in the form of silicates or mixtures thereof. The silica and/or silicates or mixtures thereof are in the non-metallic slag forming constituents at a percentage of at least 0.5% by weight of the electrode. This gives at least 8.0% by weight of the flux itself. The silica has been increased to about 80% of the flux or 7.0% of the cored electrode. Table I relates to weight percentage of the electrode. The fill in the core is 25% of the electrode weight. The flux agents are about 26% to 38% of the fill, the remaining being iron and alloys. Consequently the flux constituents set forth in Table I are approximately 6-10% of the total weight of the electrode in which they are incorporated as core material. The values of these constituents in percentage of flux can be obtained by simply dividing 100 times the percent of any one flux constituent by the sum total of all flux constituent percentages. Thus, the silica percentage ranges from 20% to 40% of the flux itself in the illustrated experiments. For that reason, the range of silica is approximately 10-50% by weight of the flux material in the preferred embodiments. The percentage can be up to about 80.0% of the flux. The bismuth releasing agent of the various flux compositions set forth in Table I are incorporated as about at least 0.05% by weight of the electrode or at least 0.5% by weight of the flux. (See Example No. 1 of Table I) Titanium dioxide is incorporated into the flux in the range of 20-65% by weight of the flux itself in the illustrated embodiment. Tests show the titanium dioxide can be as high as about 90% of the flux. Calcium fluoride is incorporated in the flux in a range of 0.5-2.5% by weight of the flux. Fluoride of calcium or sodium is included in the range of 0.5-2.5% of the flux. A strong basic metal oxide which is sodium oxide is also incorporated as one of the non-metallic slag forming constituents of the flux. This basic oxide is incorporated in an amount of at least 2.0% by weight of the flux itself, or over 0.2% of the weight of the electrode when the flux is combined with an electrode. In the flux of the present invention, zirconium dioxide is also incorporated in the range of at least 0.2% by weight of the flux. This can be expanded to 0.05-2.0% of the electrode. The percentages set forth in Table I can be used when the flux is employed either as a part of the electrode or in a submerged arc situation external of the electrode. In both instances, the bismuth compound disassociates in the electric arc and affects the slag/metal interface to retain its protective covering during solidification and cooling of the slag. The interface allows a certain amount of slippage so that excessive compressive forces are not exerted on the crystalline slag, as the slag is formed and as the chromium-bearing alloy weld bead solidifies. This produces a quiet slag behavior during cooling for maintaining the slag over the weld bead to protect the cooling weld bead from excessive oxidation and/or contamination by oxygen and nitrogen. By the novel interface concepts, the slag can be easily removed after the weld bead has cooled.

To illustrate the distinction between the present invention and prior concepts of employing any low melting point metal oxides as the slag releasing agent, tests were conducted on various low melting point oxides as replacement for the bismuth containing constituents of the present invention. The results of these tests are set forth in Table II illustrated in FIG. 2.

Table II indicates clearly that the use of low melting point oxides in the slag forming constituents of a stainless steel arc welding electrode (E 308 LT-1, AWS A5.22) does not produce acceptable slag behavior or slag removal characteristics. Indeed, lead oxide produces explosive slag behavior and "very difficult" slag removal characteristics. This metal oxide would not be of any assistance in improving the slag behavior for stainless steel welding by arc welding techniques. Lead oxide produces "popping" slag behavior and "difficult" slag removal characteristics. This constituent which is a low melting point metal oxide is not acceptable for use in stainless steel arc welding processes. The only metal oxide which would have any advantage in use in stainless steel arc welding processes would be bismuth oxide. This would not be for the reason that it is a low melting point metal oxide, but because it contains bismuth which elemental metal will affect the slag metal interface which concept is the contribution to the art of the present invention. There is a distinction between use of a low melting point metal oxide and the use of the present invention to produce a desired slag behavior. This is apparent since the present invention uses elemental bismuth, bismuth fluoride, bismuth sulfide, bismuth titanate, bismuth oxy carbonate, and bismuth oxy-chloride and mixtures thereof. These bismuth compounds are incorporated into the slag forming components of the slag forming system in the percentages of 0.05-0.75% by weight of the electrode itself. This percentage can be multiplied by about 10.0 to obtain the percentage of these bismuth producing substances in the flux itself. Table I relates to the non-metallic portion of the core material in the electrode. It is realized that bismuth is a metallic substance but it is incorporated into the fill material of the core as a source of bismuth to the flux during the arc welding process.

When elemental bismuth is employed as either a powder in the core fill material or as an alloy in the steel of the electrode, it should be used in a percentage of at least about 0.07%. At 0.05% as shown in Table I, there are some problems with the slag. At 0.25 of bismuth, the slag is quiet and easy to remove. Below are two electrode composition summaries and a submerged arc example employing the present invention.

| ELECTRODE A | |
|---|---|
| | % wt. of Electrode |
| A. Slag Forming Components | |
| (a) Silica (Silicates) | 1.0%-20% |
| (Reduce spatter, slag wetting) | |
| Preferred | 3.6% |
| (b) Titanium Dioxide | 1.0-22% |
| (Solidify slag at high temperature) | |
| (Portion of Manganese Oxide is equivalent) | |
| Preferred | 4.1% |
| (c) Sodium Oxide | over 0.1% |
| (Stabilize arc, slag wetting) | |
| Preferred | 0.7% |
| (d) Fluoride (Na or Ca) | 0.05-0.5% |
| (Reduces porosity by reducing diffusible H$_2$) | |
| Preferred | 0.10% |
| (e) Zirconium Dioxide | up to 2.0% |
| (Solidify slag at higher temperature) | |
| Preferred | 0.50% |
| (f) Potassium Oxide, Potassium Fluoride or Sodium Fluoride | 0.05-0.75% |
| (Stabilize arc, improves metal transfer) | |
| Preferred | 0.10% |
| (g) Elemental Bismuth, Bismuth Fluoride, Bismuth Sulfide, Bismuth Titanate, Bismuth oxy carbonate, Bismuth oxy-chloride and mixtures thereof | 0.05-0.50% |
| Preferred | (See TABLE I) |
| B. Metal | |
| Chromium | 15-30% |
| Nickel | 8-16% |
| Iron | Balance |

| ELECTRODE B | |
|---|---|
| | % wt. of Electrode |
| A. Slag Forming Components | |
| (a) Silica (Silicates) | 1.0-20% |
| Preferred | 3.6% |
| b) Titanium Dioxide | 1.0-22% |
| Preferred | 4.1% |
| (c) Sodium Oxide | Over 0.1% |
| Preferred | 0.7% |
| Fluoride (Na or Ca) | 0.05-0.5% |
| Preferred | 0.10% |
| (e) Zirconium Dioxide | up to 2.0% |
| Preferred | 0.50% |
| B. Metal | |
| Chromium | 15-30% |
| Nickel | 8-16% |
| Bismuth | .05-0.75% |
| Iron | Balance |
| Preferred | 0.15 |

The invention can be used as a submerged arc flux that contains silica and a metal cored electrode containing chromium and bismuth or a bismuth compound.

| ELECTRODE C | |
|---|---|
| Component | % wt. of Electrode |
| Chromium | 1.0-40% |
| Bismuth or bismuth component | 0.5-2.0% |
| Iron, other alloys and minor slag formers | Balance |

In a submerged arc system, the flux to electrode (metal) ratio is 10-20 times as great as in a flux cored electrode; thus, 10-20 times as much bismuth is used in the above example.

In hardfacing by submerged arc with a chromium-bearing alloy wire, a flux with 10-70% silica by weight of flux has been used with bismuth added to the wire or the flux. The addition of the bismuth improved the slag characteristics according to the invention.

Having thus defined the invention, the following is claimed:

1. A flux for use in arc welding of a steel workpiece with a consumable metal electrode having a percentage of chromium, said welding flux comprising a silica containing system for forming slag on the surface of the deposited chromium-bearing alloy weld metal and a bismuth containing slag releasing agent selected from the class consisting of elemental bismuth, bismuth fluoride, bismuth sulfide, bismuth titanate, bismuth oxy carbonate, bismuth oxy-chloride and mixtures thereof.

2. A flux as defined in claim 1 wherein said percentage of chromium in said flux is such that said resulting weld metal comprises over 1.0 percent chromium by weight.

3. A flux as defined in claim 1 wherein said percentage of chromium in said flux is such that said resulting weld metal contains over about 15 percent chromium by weight.

4. A flux as defined in claim 1 wherein said flux is used in arc welding of a stainless steel workpiece.

5. A flux as defined in claim 1 wherein said slag forming system includes silica in the form of silicon dioxide and/or a silicate and/or mixtures thereof.

6. A flux as defined in claim 5 wherein said silica is at least 4.0 percent by weight of said flux.

7. A flux as defined in claim 5 wherein said silica is less than about 80.0 percent by weight of said flux.

8. A flux as defined in claim 1 wherein said flux is part of said electrode and said bismuth slag releasing agent of said flux is at least 0.05 percent by weight of said electrode.

9. A flux as defined in claim 1 wherein said slag forming system includes titanium dioxide.

10. A flux as defined in claim 9 wherein said titanium dioxide is 20-65% of the weight of said flux.

11. A flux as defined in claim 1 wherein said slag forming system includes calcium fluoride or sodium fluoride.

12. A flux as defined in claim 11 wherein said sodium fluoride or calcium fluoride is 0.5-2.5 percent of the weight of said flux.

13. A flux as defined in claim 1 wherein said slag forming system includes a strong basic metal oxide.

14. A flux as defined in claim 13 wherein said basic oxide is sodium oxide.

15. A flux as defined in claim 14 wherein said basic oxide is at least about 2.0 percent of said flux.

16. A flux as defined in claim 13 wherein said basic oxide is at least about 2.0 percent of said flux.

17. A flux as defined in claim 1 wherein said slag forming system includes zirconium dioxide.

18. A flux as defined in claim 17 wherein said zirconium dioxide is at least 0.2 percent of weight of said flux.

19. A flux for use in arc welding of a steel workpiece with a consumable metal electrode having a percentage of chromium, said welding flux comprising a silica containing system for forming slag on the surface of the deposited chromium-bearing alloy weld metal and a bismuth containing slag releasing agent selected from the class consisting of a bismuth compound without elemental oxygen and mixtures thereof.

20. An electrode for use in arc welding of a stainless steel workpiece with a consumable metal electrode having at least 1.0 percent of chromium, said welding electrode having an integral flux comprising a silica containing system for forming slag on the surface of the deposited chromium-bearing alloy weld metal and a bismuth containing slag releasing agent selected from the class consisting of bismuth fluoride, bismuth sulfide, bismuth titanate, bismuth oxy carbonate, bismuth oxy-chloride and mixtures thereof.

21. An electrode as defined in claim 20 wherein said electrode contains over about 15 percent chromium by weight of said electrode.

22. An electrode as defined in claim 20 wherein said slag forming system includes silica in the form of free silica and silica in combination with basic oxides.

23. An electrode as defined in claim 22 wherein said silica is at least 1.0 percent by weight of said electrode.

24. A flux as defined in claim 23 wherein said silica is less than about 5.0 percent by weight of said electrode.

25. An electrode as defined in claim 20 wherein said slag releasing agent of said flux is at least 0.05 percent by weight of said electrode.

26. A flux for use in arc welding of a stainless steel workpiece with a consumable metal electrode having a percentage of chromium of over about 15% by weight of said electrode, said welding flux comprising a silica containing system for forming slag on the surface of the deposited chromium-bearing alloy weld metal and a bismuth containing slag releasing agent selected from the class consisting of bismuth fluoride, bismuth sulfide, bismuth titanate, bismuth oxy carbonate, bismuth oxy-chloride and mixtures thereof.

27. A flux as defined in claim 26 wherein said flux and electrode have a given combined weight and said flux is about 5-10% by weight of said combined weight.

28. A flux as defined in claim 27 including in percentages of said combined weight:

| Silica (Silicates) | 1.0-20% |
| Titanium Dioxide | 1.0-22% |
| Sodium Oxide | Over 0.1% |
| Fluoride (Na or Ca) | 0.05-0.5% |
| Zirconium Dioxide or Sodium Oxide | Up to 2.0% |
| Potassium Oxide, Potassium Fluoride or Sodium Fluoride | 0.05-0.50% |
| Bismuth Containing slag releasing agent | 0.05-0.75% |

29. An electrode for use in arc welding of a stainless steel workpiece with a consumable metal electrode having at least 15.0 percent of chromium, said welding electrode having an integral flux comprising a silica containing system for forming slag on the surface of the deposited chromium-bearing alloy weld metal and a bismuth containing slag releasing agent selected from the class consisting of elemental bismuth, bismuth fluoride, bismuth sulfide, bismuth titanate, bismuth oxy carbonate, bismuth oxy-chloride and mixtures thereof.

30. An electrode as defined in claim 29 including in percentages of said electrode:

| Silica (Silicates) | 1.0-20% |
| Titanium Dioxide | 1.0-22% |
| Sodium Oxide | Over 0.1% |
| Fluoride (Na or Ca) | 0.05-0.5% |
| Zirconium Dioxide or Sodium Oxide | Up to 2.0% |
| Potassium Oxide, Potassium Fluoride or Sodium Fluoride | 0.05-0.50% |
| Bismuth Containing slag releasing agent | 0.05-0.75% |

31. An electrode for use in arc welding of a stainless steel workpiece with a consumable metal electrode having at least 15.0 percent of chromium and 0.05-0.50 percent bismuth, said welding electrode having a silica containing system for forming slag on the surface of the deposited chromium-bearing alloy weld metal, said system comprising in percentages of said electrode:

| Silica (Silicates) | 1.0-20% |
| Titanium Dioxide | 1.0-22% |
| Sodium Oxide | Over 0.1% |
| Fluoride (Na or Ca) | 0.05-0.5% |
| Zirconium Dioxide or Sodium Oxide | Up to 2.0% |
| Potassium Oxide, Potassium Fluoride or Sodium Fluoride | 0.05-0.50% |

32. A flux for use in arc welding of a steel workpiece with a consumable metal electrode having a percentage of chromium wherein said flux and electrode have a given combined weight and said flux is at least 10% by weight of said combined weight, said weld flux comprising a silica containing system for forming slag on the surface of the deposited chromium bearing alloy weld metal, said silica system comprising at least 10% silica by weight of the flux and a bismuth containing slag releasing agent selected from the class consisting of elemental bismuth, bismuth fluoride, bismuth sulfide, bismuth titanate, bismuth, bismuth fluoride, bismuth sulfide, bismuth titanate, bismuth oxy carbonate, bismuth oxy-chloride and mixtures thereof.

33. A flux as defined in claim 32 wherein said percentage of chromium in said flux is such that said resulting weld metal comprises over 1.0 percent chromium by weight.

34. A flux as defined in claim 32 wherein said percentage of chromium in said flux is such that said resulting weld metal contains over about 15 percent chromium by weight.

35. A flux as defined in claim 32 wherein said flux is used in arc welding of a stainless steel workpiece.

36. An electrode as defined in claim 32 wherein said slag forming system includes silica in the form of free silica and silica in combination with basic oxides.

37. A flux as defined in claim 32 wherein said slag forming system includes silica in the form of silicon dioxide and/or a silicate and/or mixtures thereof.

38. A flux as defined in claim 37 wherein said silica is less than about 80.0 percent by weight of said flux.

39. A flux as defined in claim 32 wherein said flux is part of said electrode and said bismuth slag releasing agent of said flux is at least 0.05 percent by weight of said electrode.

40. A flux as defined in claim 32 wherein said slag forming system includes titanium dioxide.

41. A flux as defined in claim 40 wherein said titanium dioxide is 20–65% of the weight of said flux.

42. A flux as defined in claim 32 wherein said slag forming system includes calcium fluoride or sodium fluoride.

43. A flux as defined in claim 42 wherein said sodium fluoride or calcium fluoride is 0.5–2.5 percent of the weight of said flux.

44. A flux as defined in claim 32 wherein said slag forming system includes a strong basic metal oxide.

45. A flux as defined in claim 44 wherein said basic oxide is sodium oxide.

46. A flux as defined in claim 45 wherein said basic oxide is at least about 2.0 percent of said flux.

47. A flux as defined in claim 44 wherein said basic oxide is at least about 2.0 percent of said flux.

48. A flux as defined in claim 32 wherein said slag forming system includes zirconium dioxide.

49. A flux as defined in claim 48 wherein said zirconium dioxide is at least 0.2 percent of weight of said flux.

50. A flux as defined in claim 32 including in percentages of said combined weight:

| | |
|---|---|
| Silica (Silicates) | 1.0–20% |
| Titanium Dioxide | 1.0–22% |
| Sodium Oxide | Over 0.1% |
| Fluoride (Na or Ca) | 0.05–0.5% |
| Zirconium Dioxide or Sodium Oxide | Up to 2.0% |
| Potassium Oxide, Potassium Fluoride or Sodium Fluoride | 0.05–0.50% |
| Bismuth Containing slag releasing agent | 0.05–0.75% |

51. A flux for use in arc welding of a steel workpiece with a consumable metal electrode having a percentage of chromium, said welding flux comprising a strong basic metal oxide and a silica containing system for forming slag on the surface of the deposited chromium-bearing alloy weld metal and a bismuth containing slag releasing agent selected from the class consisting of elemental bismuth, bismuth fluoride, bismuth sulfide, bismuth titanate, bismuth oxy carbonate, bismuth oxy-chloride and mixtures thereof.

52. A flux as defined in claim 51 wherein said basic oxide is sodium oxide.

53. A flux as defined in claim 52 wherein said basic oxide is at least about 2.0 percent of said flux.

54. A flux as defined in claim 51 wherein said basic oxide is at least about 2.0 percent of said flux.

55. A flux as defined in claim 51 including in percentages of said combined weight:

| | |
|---|---|
| Silica (Silicates) | 1.0–20% |
| Titanium Dioxide | 1.0–22% |
| Sodium Oxide | Over 0.1% |
| Fluoride (Na or Ca) | 0.05–0.5% |
| Zirconium Dioxide or Sodium Oxide | Up to 2.0% |
| Potassium Oxide, Potassium Fluoride or Sodium Fluoride | 0.05–0.50% |
| Bismuth Containing slag releasing agent | 0.05–0.75% |

* * * * *